US011964243B2

(12) United States Patent
Li et al.

(10) Patent No.: US 11,964,243 B2
(45) Date of Patent: Apr. 23, 2024

(54) ATOMIZATION GENERATOR AND SPECIAL HIGH-PRESSURE ATOMIZATION GENERATION DEVICE FOR INCREASING OIL AND GAS FIELD RECOVERY

(71) Applicant: Shandong Ruiheng Xingyu Petroleum Technology Development Co., Ltd., Shandong (CN)

(72) Inventors: Dayong Li, Qingdao (CN); Tongwu An, Qingdao (CN); Xuegang Liu, Qingdao (CN); Yonglin Zhong, Qingdao (CN); Qiaoling Meng, Qingdao (CN); Jiabu Wang, Qingdao (CN); Jiankui Li, Qingdao (CN); Mingqian Shen, Qingdao (CN); Yuxin Dong, Qingdao (CN); Dongsheng Zhang, Qingdao (CN); Fulin Zheng, Qingdao (CN); Ming Wei, Qingdao (CN)

(73) Assignee: Shandong Ruiheng Xingyu Petroleum Technology Development Co., Ltd., Shandong (CN)

( * ) Notice: Subject to any disclaimer, the term of this patent is extended or adjusted under 35 U.S.C. 154(b) by 462 days.

(21) Appl. No.: 17/395,834

(22) Filed: Aug. 6, 2021

(65) Prior Publication Data

US 2023/0042749 A1 Feb. 9, 2023

(51) Int. Cl.

| | |
|---|---|
| ***B01F 23/21*** | (2022.01) |
| ***B01F 23/213*** | (2022.01) |
| ***B01F 27/722*** | (2022.01) |
| ***B01F 35/71*** | (2022.01) |
| ***E21B 43/16*** | (2006.01) |
| *B01F 101/49* | (2022.01) |

(52) U.S. Cl.

CPC ...... *B01F 23/21321* (2022.01); *B01F 27/722* (2022.01); *B01F 35/7176* (2022.01); *E21B 43/168* (2013.01); *B01F 2101/49* (2022.01)

(58) Field of Classification Search

CPC ................................................ B01F 23/21321

See application file for complete search history.

(56) References Cited

FOREIGN PATENT DOCUMENTS

CN 112473613 A * 3/2021 ............. B01J 19/26

* cited by examiner

*Primary Examiner* — Robert A Hopkins

(74) *Attorney, Agent, or Firm* — Harness, Dickey & Pierce, P.L.C.

(57) ABSTRACT

An atomization generator and a special high-pressure atomization generation device for increasing oil and gas field recovery are provided. The special high-pressure atomization generation device for increasing oil and gas field recovery includes an agent pot assembly, a gear pump, a metering pump, an atomization generator and pipelines. The gear pump is connected with the agent pot assembly through an agent pot liquid inlet pipe. The metering pump is arranged between the agent pot assembly and the atomization generator which are connected through the low-pressure manifold pipeline and the high-pressure liquid inlet pipeline. The high-pressure liquid inlet pipeline is connected with the liquid inlet pipe. The liquid inlet pipes are connected with the metering pump. The gas inlet pipe is connected with the high-pressure gas source through the high-pressure gas inlet pipe. The gas inlet cap is provided with a gas inlet pipe.

5 Claims, 4 Drawing Sheets

ATOMIZATION GENERATOR AND SPECIAL HIGH-PRESSURE ATOMIZATION GENERATION DEVICE FOR INCREASING OIL AND GAS FIELD RECOVERY

TECHNICAL FIELD

The present disclosure relates to the technical field of atomization devices, specifically an atomization generator and a special high-pressure atomization generation device for increasing oil and gas field recovery.

BACKGROUND ART

At present, injection of nitrogen (gas) into oil and gas fields for increasing recovery has been widely used in carbonate reservoirs, heavy oil reservoirs and so on at home and abroad, and has gained certain achievements.

In the construction of nitrogen injection to increase recovery, in order to solve the problems of oil layer blockage and high viscosity of heavy oil, and meet the requirement for increase of oil washing capacity, a chemical agent with functions such as blockage removal, viscosity reduction, and oil washing often need to be used cooperatively.

The chemical agent is generally injected into a formation at one time at a preconstruction stage or injected into a formation with nitrogen at different slugs. Under a formation condition, due to the slugging effect of different fluids (crude oil, chemical agent, water, gas) in the formation circulation channels (fractures/pores), they are difficult to mix uniformly, so that it difficult for most chemical agent to function, and the effect of the chemical agent is reduced.

The existing patent CN206980494U discloses a foam generator for high-pressure operations in oil and gas wells, which includes a gas inlet pipe, a first plug valve, a one-way valve, a propeller, a spiral stirring block, a thickened high-pressure-resistant main pipe, a foam fluid discharging pipe, a second plug valve, a liquid inlet pipe, and a third plug valve. An end of the thickened high-pressure-resistant main pipe is connected to the gas inlet pipe. The first plug valve and the one-way valve are installed in the gas inlet pipe, and the liquid inlet pipe is arranged beside the gas inlet pipe. The second plug valve is arranged on the liquid inlet pipe. The other end of the thickened high-pressure-resistant main pipe is provided with the foam fluid discharging pipe. A left end of the foam fluid discharging pipe communicates with the thickened high-pressure-resistant main pipe. A liquid guide pipe is arranged between an outlet arranged on a lower side of the foam liquid discharging pipe and the liquid inlet pipe. The propeller and the spiral stirring block are installed in an inner cavity of the thickened high-pressure-resistant main pipe. Nitrogen entering the gas inlet pipe is cut by the propeller and is stirred by the spiral stirring block to form uniform foam. This foam generator can form foam with the nitrogen and the chemical agent to increase the oil and gas field recovery. However, the chemical agent cannot be atomized.

SUMMARY

The embodiments aim to provide an atomization generator and a special high-pressure atomization generation device for increasing oil and gas field recovery for the above problems, which can disperse a chemical agent into high-pressure nitrogen on the ground to form uniform and stable atomized fluid injected into a formation, so that the chemical agent can be in full contact with a medium such as crude oil in the formation to expand the swept volume to enable the chemical agent to fully exert the effect and reduce the overall usage of the chemical agent, thereby reducing the cost and increasing the oil and gas recovery rate. The present disclosure provides an atomization device configured to atomize the chemical agent for injection defects of the existing chemical agent, so as to reduce the usage amount of the agents and enhance the recovery increasing effect of the agents.

In order to achieve the above objective, the present disclosure provides the following technical solution. An atomization generator includes an atomization generator barrel body, a gas inlet cap, a discharging cap, a gas distribution pipe, liquid inlet pipes, a gas inlet pipe and stirring blocks. Two ends of the atomization generator barrel body are respectively provided with a gas inlet cap and the discharging cap. A gas inlet pipe is arranged at a front end of the gas inlet cap. An end of the gas inlet pipe is connected with a high-pressure gas inlet pipeline, and an other end of the gas inlet pipe arranged in the gas inlet cap is provided with the gas distribution pipe which is a pipeline provided with circumferentially provided with several small holes. A blocking plate is arranged at the end part of the gas distribution pipe. A discharging pipe is arranged on the discharging cap. Rotatable stirring blocks are arranged inside the atomization generator barrel body. The end of the atomization generator barrel body provided with the gas inlet cap is provided with the liquid inlet pipes. The gas distribution pipe is mounted in the atomization generator barrel body, which is conducive to uniformly disperse air, without a turbulence phenomenon. The gas distribution pipe is made of a stainless steel material, so that the maintenance-free intensity is high. The liquid inlet pipe may be arranged on two sides of a front end of the atomization generator barrel body. End parts of the liquid inlet pipes arranged in the atomization generator barrel body may be provided with sprayers. Two liquid inlet pipes are provided and are respectively connected with a first high-pressure liquid inlet pipe and a second high-pressure liquid inlet pipe, mainly for matching an air-liquid volume ratio. A displacement of a double-head metering pump equipped is 540 L/h; during use with 100% of the displacement, the two liquid inlet pipes need to be used at the same time; and during use with less 60% or less of the displacement, one liquid inlet pipe may be independently used.

Further, two liquid inlet pipes may be provided and may be disposed on two sides of a front end of the atomization generator barrel body. End parts of the liquid inlet pipes arranged in the atomization generator barrel body are provided with sprayers.

Further, one or more groups of stirring blocks may be provided. One group of stirring blocks includes two spiral stirring blocks, namely, a left stirring block and a right stirring block which are symmetrically disposed and are in clearance fit with an edge of an inner cavity of the atomization generator barrel body; And the left stirring block and the right stirring block have opposite spiral directions.

Further, the right stirring block located at a rightmost end may be arranged at a rightmost end of the atomization generator barrel body by a supporting block. A right end of the right stirring block may be provided with a mounting convex block which is fitted to the supporting block.

Further, a material of the spiral stirring block is rigid polyvinyl chloride, which is high in adaptability to fluid.

A special high-pressure atomization generation device for increasing oil and gas field recovery includes an upper framework and a lower framework which are formed by structural steels. The lower framework is provided with an agent pot assembly, a gear pump, a metering pump, an atomization generator and pipelines. The pipelines include a low-pressure manifold pipeline, a high-pressure liquid inlet pipeline, a high-pressure gas inlet pipeline and a high-pressure atomization discharging pipeline. The gear pump is connected with the agent pot assembly through an agent pot liquid inlet pipe. A metering pump is arranged between the agent pot assembly and the atomization generator which are connected through the low-pressure manifold pipeline and the high-pressure liquid inlet pipeline. The high-pressure liquid inlet pipeline is connected with the liquid inlet pipe. The atomization generator includes liquid inlet pipes, a gas inlet pipe and a discharging pipe. the liquid inlet pipes are connected with the metering pump. The gas inlet pipe is connected with an external high-pressure gas source through the high-pressure gas inlet pipeline. The atomization generator further includes an atomization generator barrel body, a gas inlet cap, a discharging cap, a gas distribution pipe and stirring blocks. Two ends of the atomization generator barrel body are respectively provided with the gas inlet cap and the discharging cap. The gas inlet cap is provided with the gas inlet pipe. The discharging cap is provided with the discharging pipe. Rotatable stirring blocks are arranged inside the atomization generator barrel body. An end of the atomization generator barrel body provided with the gas inlet cap is provided with the liquid inlet pipes. And the discharging pipe is connected with the high-pressure atomization discharging pipeline.

Further, the metering pump may be a double-head metering pump. Two water inlet valves of the double-head metering pump may be respectively connected with a first low-pressure liquid inlet pipe and a second low-pressure liquid inlet pipe of the low-pressure manifold pipeline. Two water outlet valves of the double-head metering pump may be connected with the high-pressure liquid inlet pipeline. And the high-pressure liquid inlet pipeline may be connected with the liquid inlet pipes of the atomization generator.

Further, an outer periphery of the atomization generator barrel body may be arranged above the lower framework by a supporting device. The supporting device may include an arc-shaped supporting plate, a first supporting plate and a second supporting plate. The arc-shaped supporting plate may be fitted to the outer periphery of the atomization generator barrel body. The arc-shaped supporting plate may be arranged on the first supporting plate. And the first supporting plate and the second supporting plate nay be arranged on the lower framework by bolts.

Further, a sprayer at an tail end of the high-pressure atomization discharging pipeline adopts a fan-shaped spraying nozzle which is configured to uniformly disperse liquid into tiny mists. The sprayer adopts a tungsten carbide fan-shaped spraying nozzle, with pressure resistance of 100 MPa. A tungsten carbide nozzle is embedded on a UTC sprayer to achieve highest abrasion resistance. This embedded body is arranged in a groove of a stainless steel nozzle body to prevent damage. The UTC sprayer adopts a high-impact planar spraying type, and a spraying angle of the UTC sprayer is from 5 degrees to 110 degrees. The sprayer can uniformly spray small liquid drops. An edge of a spraying surface is tapered to ensure uniform coverage during spraying. An abrasive surface on an UTC tungsten carbide sprayer is parallel to the spraying surface, so that the spraying can be quickly adjusted to straight spraying by vision.

In some embodiments, a pot body of the agent pot assembly may be provided with a control box bracket, and a control box may be arranged on the control box bracket.

Further, a buffer pot may be arranged on the high-pressure liquid inlet pipeline between the double-head metering pump and the atomization generator, Metering of medicinal liquid can be controlled by the buffer pot.

Compared with the prior art, the embodiments have the following beneficial effects.

1. The chemical agent can be dispersed into high-pressure nitrogen on the ground to form uniform and stable atomized fluid injected into a formation, so that the chemical agent can be in full contact with a medium such as crude oil in the formation to expand the swept volume to enable the chemical agent to fully exert the effect and reduce the overall usage of the chemical agent, thereby reducing the cost and increasing the oil and gas recovery rate.

2. The spiral stirring block is high in intensity, high in temperature resistance and portable. Gas and water mists are mixed and stirred in the atomization generator barrel body. After multi-stage stirring of multiple groups of stirring blocks, the gas and the water mists are uniformly mixed.

3. The agent pot assembly, the gear pump, the metering pump, the atomization generator and the pipeline are integrated on a skid body composed of the upper framework and the lower framework, so that the volume is small, and hoisting and carrying are convenient.

4. The device has functions of metering agents and detecting a temperature and a pressure and is connected with the control box, and operation data is monitored in real time via PLC control. The overall device is compact in layout and is convenient to maintain, small in volume and high in quick mobility.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. It is apparent that the drawings in the illustration below are only some embodiments of the present disclosure. Those ordinarily skilled in the art also can acquire other drawings according to the provided drawings without doing creative work.

Figure 1:
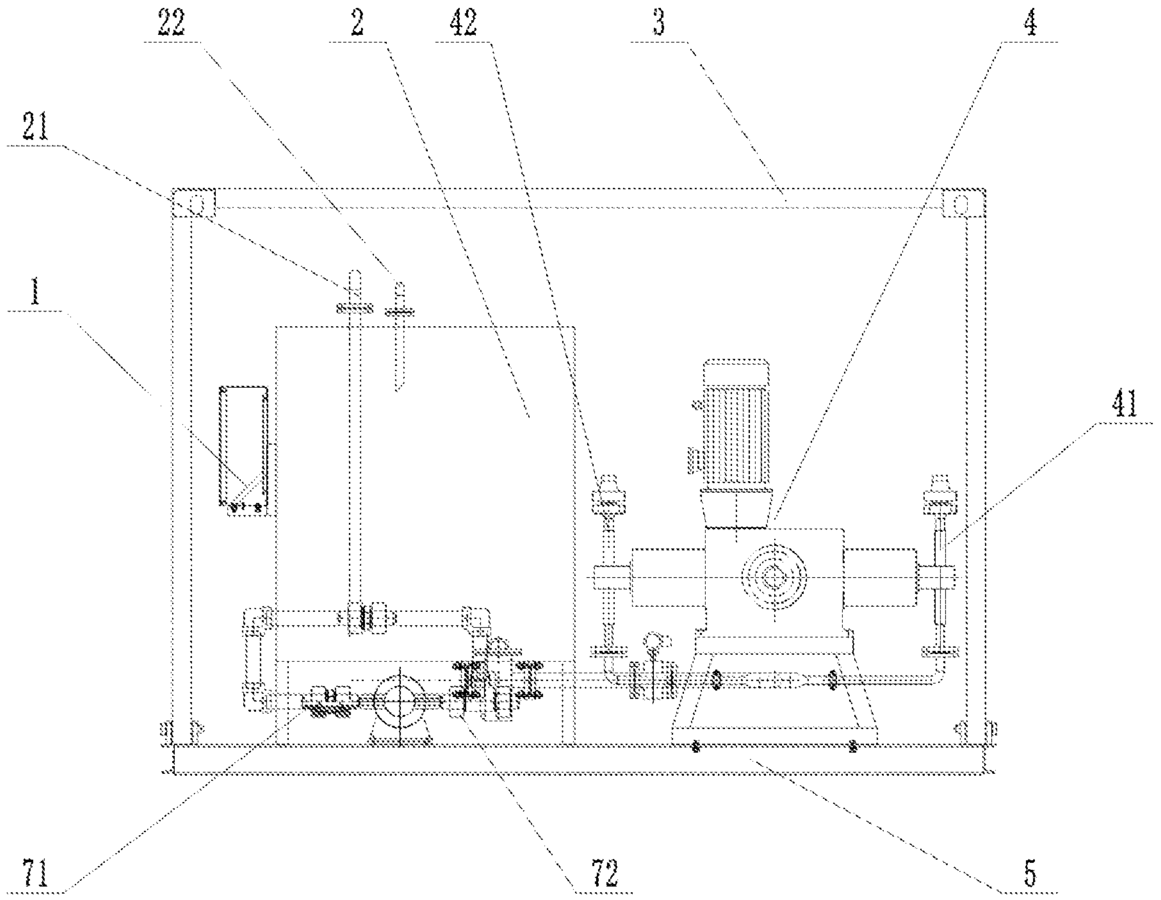
FIG. 1 is a front view of the present disclosure.

List of the reference characters 1 control box bracket; 2 agent pot assembly; 3 upper framework; 4 metering pump; 5 lower framework; 6 high-pressure gas inlet pipeline; 7 high-pressure liquid inlet pipeline; 8 low-pressure manifold pipeline; 9 high-pressure atomization discharging pipeline; 10 gear pump; 11 atomization generator; 12 control box; 21 agent pot liquid inlet pipe; 22 gas outlet pipe; 41 first low-pressure liquid inlet pipe; 42 second low-pressure liquid inlet pipe; 71 first high-pressure liquid inlet pipe; 72 second high-pressure liquid inlet pipe; 73 buffer pot; 111 gas inlet pipe; 112 gas inlet cap; 113 gas distribution pipe; 114 blocking plate; 115 left stirring block; 116 right stirring block; 1161 mounting convex block; 117 atomization generator barrel body; 118 supporting block; 119 discharging pipe; 120 discharging cap; 121 liquid inlet pipe; 122 arc-shaped supporting plate; 123 first supporting plate; and 124 second supporting plate.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments.

Figure 2:
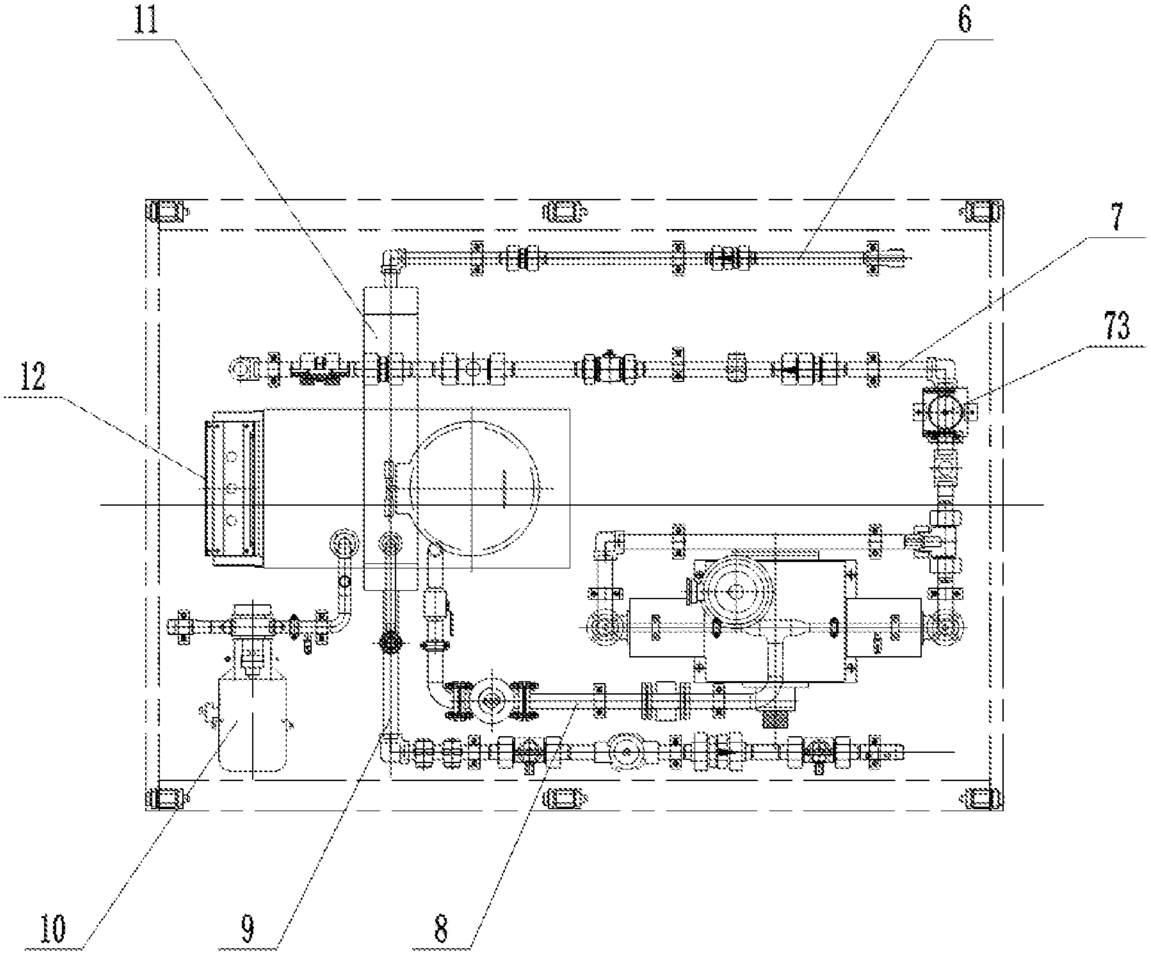
FIG. 2 is a top view of the present disclosure.
Figure 3:
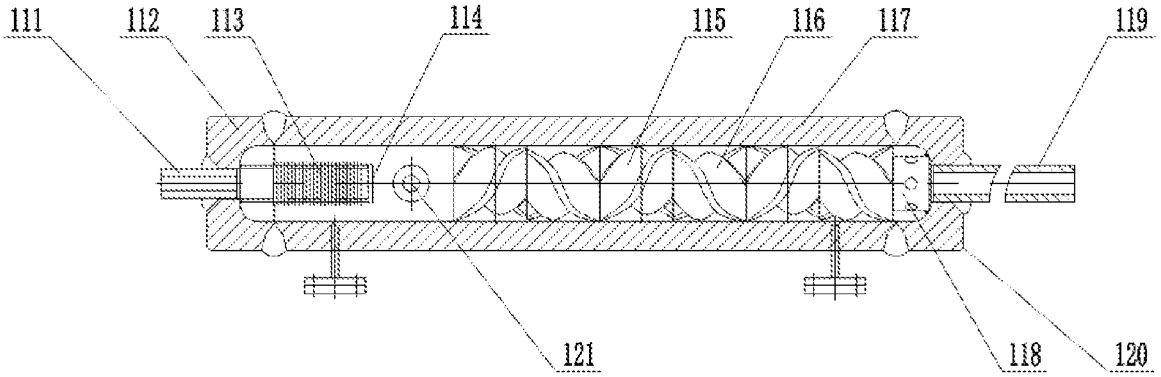
FIG. 3 is a schematic diagram of an internal structure of an atomization generator according to the present disclosure.
Figure 4:
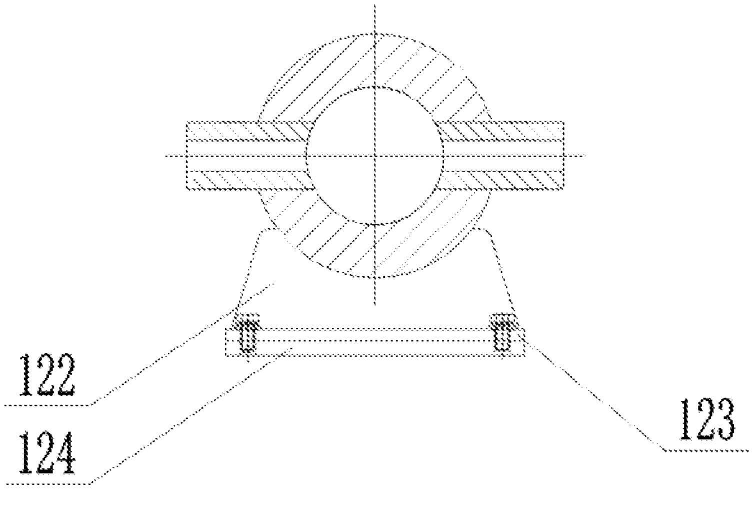
FIG. 4 is a schematic diagram of a side surface structure of an atomization generator according to the present disclosure.
Figure 5:
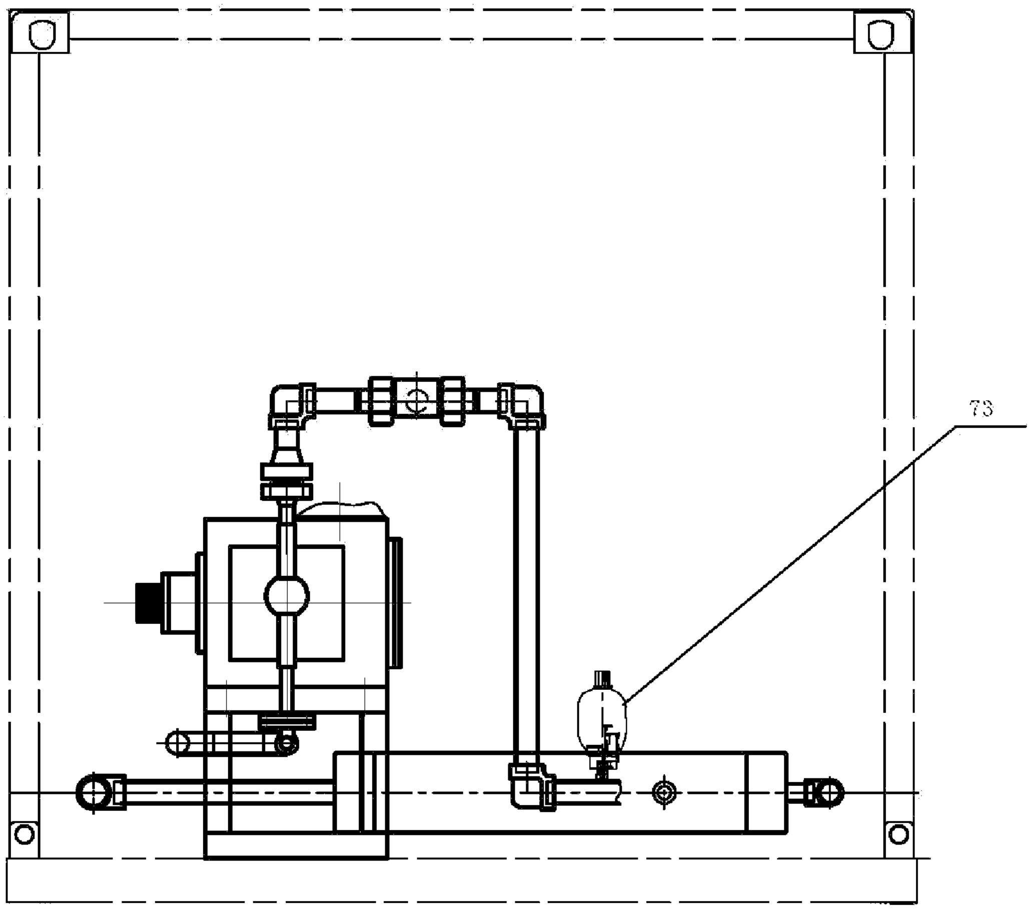
FIG. 5 is a schematic diagram of an installation position of a buffer pot according to the present disclosure.
Figure 6:
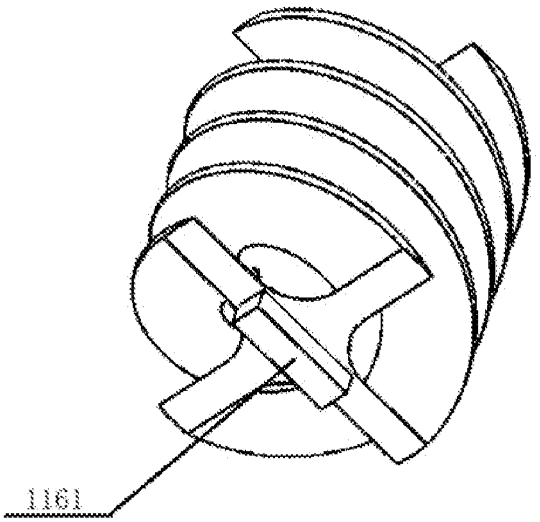
FIG. 6 is a schematic structural diagram of a right stirring block according to the present disclosure.

Now, with reference to FIG. 1 to FIG. 6, Embodiment I is described.

An atomization generator includes an atomization generator barrel body 117, a gas inlet cap 112, a discharging cap 120, a gas distribution pipe 113, liquid inlet pipes 121, a gas inlet pipe 120 and stirring blocks. Two ends of the atomization generator barrel body 117 are respectively provided with the gas inlet cap 112 and the discharging cap 120. A gas inlet pipe 111 is arranged at a front end of the gas inlet cap 112. An end of the gas inlet pipe 111 is connected with a high-pressure gas inlet pipeline 6, and the other end of the gas inlet pipe 111 arranged in the gas inlet cap 112 is provided with the gas distribution pipe 113. The gas distribution pipe 113 is a pipeline provided with circumferentially several small holes. A blocking plate 114 is arranged at an end part of the gas distribution pipe 113. A discharging pipe 119 is arranged in the discharging cap 120. Rotatable stirring blocks are arranged inside the atomization generator barrel body 117. The end of the atomization generator barrel body 117 provided with the gas inlet cap 112 is provided with the liquid inlet pipes 121.

Two liquid inlet pipes 121 are provided and are disposed on two sides of a front end of the atomization generator barrel body 117. And end parts of the liquid inlet pipes 121 in the atomization generator barrel body 117 are provided with sprayers.

One or more groups of stirring blocks are provided. One group of stirring blocks includes two spiral stirring blocks, namely a left stirring block 115 and a right stirring block 116. The left stirring block 115 and the right stirring block 116 are symmetrically disposed and are in clearance fit with an edge of an inner cavity of the atomization generator barrel body 117.

The right stirring block 116 located at the rightmost end is arranged at the rightmost end of the atomization generator barrel body 117 by a supporting block 118. A right end of the right stirring block 116 is provided with a mounting convex block 1161, which is fitted to the supporting block 118.

A material of the spiral stirring block is rigid polyvinyl chloride.

The gas distribution pipe 113 is mounted in the atomization generator barrel body 117, which is favorable for uniformly dispersing air, without a turbulence phenomenon. The gas distribution pipe 113 is made of a stainless steel material, and thus can be free from maintenance for a long time. The liquid inlet pipe is arranged on two sides of the front end of the atomization generator barrel body 117; the end parts of the liquid inlet pipes in the atomization generator barrel body 117 is provided with sprayers. Two liquid inlet pipes are provided and are respectively connected with a first high-pressure liquid inlet pipe 71 and a second high-pressure liquid inlet pipe 72, mainly for matching an air-liquid volume ratio. A displacement of a double-head metering pump equipped is 540 L/h; during use with 100% of the displacement, the two liquid inlet pipes need to be used at the same time; and during use with less 60% or less of the displacement, one liquid inlet pipe may be independently used.

A special high-pressure atomization generation device for increasing oil and gas field recovery includes an upper framework 3 and a lower framework 5 which are formed by structural steels. The lower framework 5 is provided with an agent pot assembly 2, a gear pump 10, a metering pump 4, an atomization generator 11 and pipelines. The pipelines include a low-pressure manifold pipeline 8, a high-pressure liquid inlet pipeline 7, a high-pressure gas inlet pipeline 6 and a high-pressure atomization discharging pipeline 9. The gear pump 10 is connected with the agent pot assembly 2 through an agent pot liquid inlet pipe 22. A gas outlet pipe 21 is arranged above the agent pot assembly 2. A metering pump 4 is arranged between the agent pot assembly 2 and the atomization generator 11, which are connected through the low-pressure manifold pipeline 7 and the high-pressure liquid inlet pipeline 8. The atomization generator 11 includes liquid inlet pipes 121, a gas inlet pipe 111 and a discharging pipe 119. The liquid inlet pipes 121 are connected with the metering pump 4; the gas inlet pipe 111 is connected with an external high-pressure gas source through the high-pressure gas inlet pipeline 6. The atomization generator 11 further includes an atomization generator barrel body 117, a gas inlet cap 112, a discharging cap 120, a gas distribution pipe 113 and stirring blocks. Two ends of the atomization generator barrel body 117 are respectively provided with the gas inlet cap 112 and the discharging cap 120. The gas inlet cap 112 is provided with the gas inlet pipe 111. The discharging cap 120 is provided with the discharging pipe 119. The rotatable stirring blocks are arranged inside the atomization generator barrel body 117; an end of the atomization generator barrel body 117 provided with the gas inlet cap 112 is provided with the liquid inlet pipes 121; and the discharging pipe 119 is connected with the high-pressure atomization discharging pipeline 9.

Further, the metering pump 4 is a double-head metering pump. Two water inlet valves of the double-head metering pump are respectively connected with a first low-pressure liquid inlet pipe 41 and a second low-pressure liquid inlet pipe 42 of the low-pressure manifold pipeline 8. Two water outlet valves of the double-head metering pump are connected with the high-pressure liquid inlet pipeline 7. And the high-pressure liquid inlet pipeline 7 is connected with the liquid inlet pipes 121 of the atomization generator 11.

Further, the liquid inlet pipe 121 is arranged on two sides of the front end of the atomizer generator barrel body 117. And two liquid inlet pipes 121 are provided and are respectively connected with a first high-pressure liquid inlet pipe 71 and a second high-pressure liquid inlet pipe 72.

Further, an outer periphery of the atomization generator barrel body 117 is arranged above the lower framework 5 by a supporting device. The supporting device includes an arc-shaped supporting plate 122, a first supporting plate 123 and a second supporting plate 124. The arc-shaped supporting plate 122 is fitted to the outer periphery of the atomization generator barrel body 117. The arc-shaped supporting plate 122 is arranged on the first supporting plate 123; and the first supporting plate 123 and the second supporting plate 124 are arranged on the lower framework 5 by bolts.

Further, a sprayer at a tail end of the high-pressure atomization discharging pipeline 9 adopts a fan-shaped spraying nozzle which is configured to uniformly disperse liquid into tiny mists. The sprayer adopts a tungsten carbide fan-shaped spraying nozzle, with pressure resistance of 100 MPa. A tungsten carbide nozzle is embedded on a UTC sprayer to achieve highest abrasion resistance. This embedded body is arranged in a groove of a stainless steel nozzle body to prevent damage. The UTC sprayer adopts a high-impact planar spraying type, and a spraying angle of the UTC sprayer is from 5 degrees to 110 degrees. The sprayer can uniformly spray small liquid drops. An edge of a spraying surface is tapered to ensure uniform coverage during spraying. An abrasive surface on an UTC tungsten carbide sprayer is parallel to the spraying surface, so that the spraying can be quickly adjusted to straight spraying by vision. In some embodiments, a pot body of the agent pot assembly 2 is provided with a control box bracket 1, and a control box 12 is arranged on the control box bracket 1. The device also has functions of metering agents and detecting a temperature and a pressure and is connected with the control box 12, and operation state is monitored in real time through PLC control.

Further, a buffer pot 73 is arranged on the high-pressure liquid inlet pipeline 7 between the double-head metering pump and the atomization generator 11.

A working principle of the device is as follows. Firstly, external medicinal liquid enters the pot body of the agent pot assembly 2 by using the gear pump 10 through the agent pot liquid inlet pipe 22. When a chemical agent is provided in the pot body, the medicinal liquid in the pot body communicates with the two water inlet valves of the double-head metering pump through the low-pressure manifold pipeline 8. The water outlet valves of the double-head metering pump are jointly gathered on one high-pressure liquid inlet pipeline 7. The high-pressure liquid inlet pipeline 7 is branched to form the first high-pressure liquid inlet pipe 71 and the second high-pressure liquid inlet pipe 72 which respectively communicate with two symmetric liquid inlet pipes 121 of the atomization generator 11. In addition, an external gas source communicates with the gas inlet pipe 111 of the atomization generator 11 through the high-pressure gas inlet pipeline 6. When switches of the relevant pipelines of the double-head metering pump and a high-pressure gas inlet pipeline are turned on, high-pressure gas passes through the gas inlet pipe 111, and is discharged through the small holes of the gas distribution pipe 113 to form dispersed gas. Medicinal liquid such as a chemical agent becomes mists through the sprayers of the liquid inlet pipes 121. High-pressure dispersed gas and high-pressure mists pass through an inner cavity of the atomization generator barrel body 117 and drive the spiral stirring block to rotate in the inner cavity. The rotation of the spiral stirring blocks enables the medicinal liquid mists and the high-pressure dispersed gas to be uniformly mixed to form atomized fluid, which is discharged through the discharging pipe 119. After multi-stage stirring, the formed atomized fluid is more conducive to the use of the medicinal liquid such as the chemical agent.

For those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure. No drawing markings in claims shall be deemed to limit the claims involved.

What is claimed is:

1. A special high-pressure atomization generation device for increasing oil and gas field recovery, comprising an upper framework (3) and a lower framework (5) which are formed by structural steels, wherein the lower framework (5) is provided with an agent pot assembly (2), a gear pump (10), a metering pump (4), an atomization generator (11) and pipelines, the pipelines comprise a low-pressure manifold pipeline (8), a high-pressure liquid inlet pipeline (7), a high-pressure gas inlet pipeline (6) and a high-pressure atomization discharging pipeline (9), a gas outlet pipe (21) is arranged above the agent pot assembly (2), the atomization generator comprises an atomization generator barrel body (117), a gas inlet cap (112), a discharging cap (120), a gas distribution pipe (113), liquid inlet pipes (121), a gas inlet pipe (120) and stirring blocks, two ends of the atomization generator barrel body (117) are respectively provided with a gas inlet cap (112) and a discharging cap (120), the gas inlet cap (112) is provided with a gas inlet pipe (111), the discharging cap (120) is provided with a discharging pipe (119), rotatable stirring blocks are arranged inside the atomization generator barrel body (117), an end of the atomization generator barrel body (117) provided with the gas inlet cap (112) is provided with liquid inlet pipes (121), the gear pump (10) is connected with the agent pot assembly (2) through an agent pot liquid inlet pipe (22), a metering pump (4) is arranged between the agent pot assembly (2) and the atomization generator (11) which are connected through the low-pressure manifold pipeline (7) and the high-pressure liquid inlet pipeline (8), the low-pressure manifold pipeline (7) is connected with the liquid inlet pipes (121), the liquid inlet pipes (121) are connected with the metering pump (4), the gas inlet pipe (111) is connected with an external high-pressure gas source through the high-pressure gas inlet pipeline (6), the discharging pipe (119) is connected with the high-pressure atomization discharging pipeline (9), and a tail end of the high-pressure atomization discharging pipeline (9) is provided with a sprayer using a fan-shaped spraying nozzle.

2. The special high-pressure atomization generation device for increasing oil and gas field recovery according to claim 1, wherein the metering pump (4) is a double-head metering pump, two water inlet valves of the double-head metering pump are respectively connected with a first low-pressure liquid inlet pipe (41) and a second low-pressure liquid inlet pipe (42) of the low-pressure manifold pipeline (8), two water outlet valves of the double-head metering pump are connected with the high-pressure liquid inlet pipeline (7), the high-pressure liquid inlet pipeline (7) is connected with the liquid inlet pipes (121) of the atomization generator (11), and the high-pressure liquid inlet pipeline (7) between the double-head metering pump and the atomization generator (11) is provided with a buffer pot (73).

3. The special high-pressure atomization generation device for increasing oil and gas field recovery according to claim 1, wherein two liquid inlet pipes (121) are respectively connected with a first high-pressure liquid inlet pipe (71) and a second high-pressure liquid inlet pipe (72).

4. The special high-pressure atomization generation device for increasing oil and gas field recovery according to claim 3, wherein an outer periphery of the atomization generator barrel body (117) is arranged above the lower framework (5) by a supporting device which comprises an arc-shaped supporting plate (122), a first supporting plate (123) and a second supporting plate (124), the arc-shaped supporting plate (122) is fitted to the outer periphery of the atomization generator barrel body (117), the arc-shaped supporting plate (122) is arranged on the first supporting plate (123), and the first supporting plate (123) and the second supporting plate (124) are arranged on the lower framework (5) by bolts.

5. The special high-pressure atomization generation device for increasing oil and gas field recovery according to claim 1, wherein a pot body of the agent pot assembly (2) is provided with a control box bracket (1), and a control box (12) is arranged on the control box bracket (1).

* * * * *